Sept. 14, 1965  Y. PETERSON  3,206,176
APPARATUS FOR AERATING SEWAGE
Filed Feb. 14, 1963
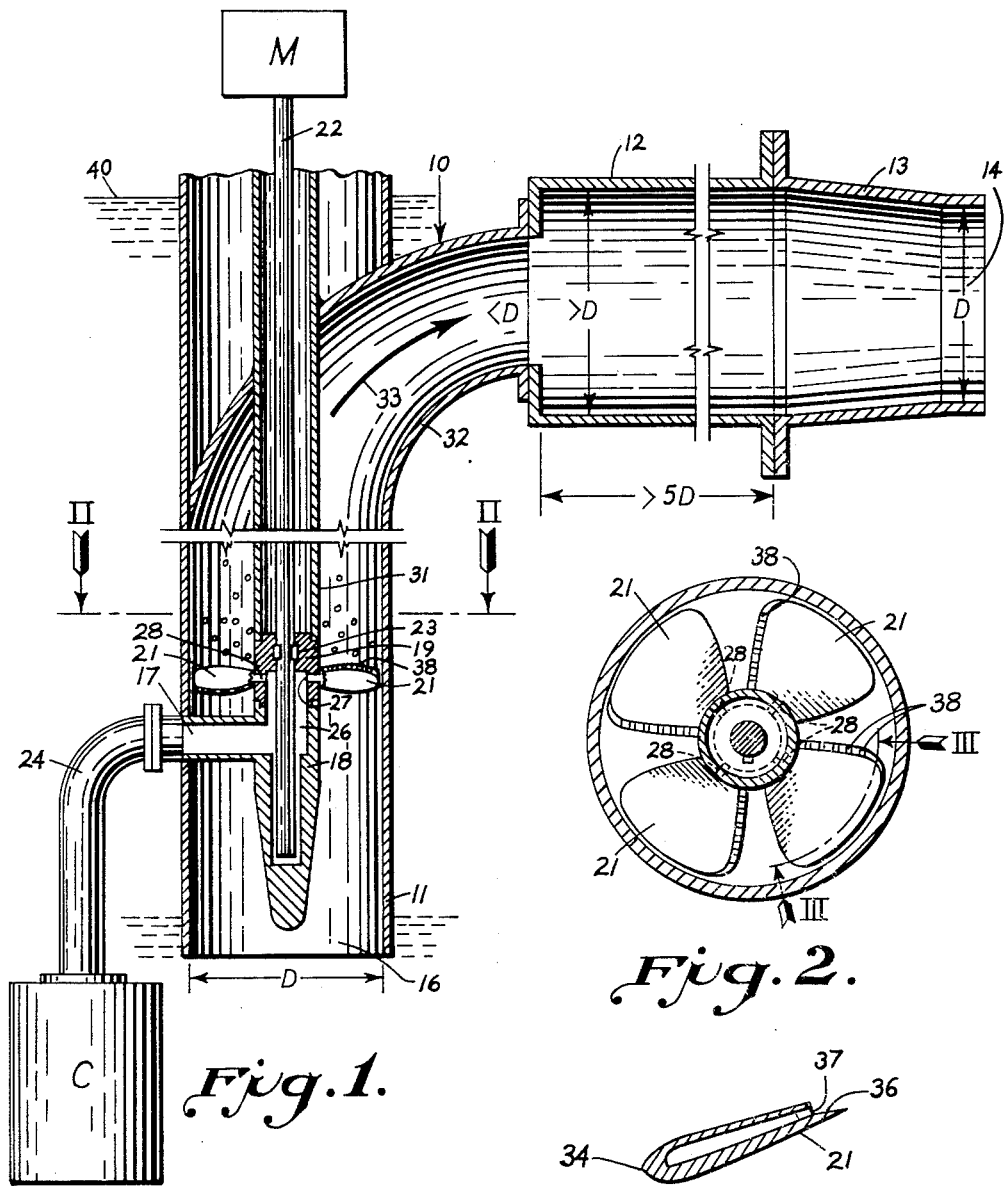
Fig.1.
Fig.2.
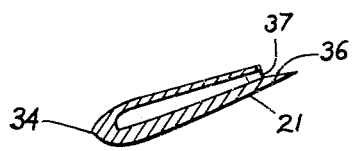
Fig.3.
INVENTOR.
YORK PETERSON
BY H. W. Brelsford
ATTORNEY

3,206,176
APPARATUS FOR AERATING SEWAGE
York Peterson, 308 Canon Drive, Santa Barbara, Calif.
Filed Feb. 14, 1963, Ser. No. 258,559
2 Claims. (Cl. 261—29)

My invention relates to method and apparatus for aerating sewage and has particular reference to the aeration of sewage to promote the action of aerobic bacteria in the treatment of sewage.

In the treatment of sewage the object is to obtain the settling of sewage solids. This requires the treatment of unsettleable solids to change them into an inert state so that thereafter they can be separated from the liquid carrier. The liquid carrier can then be discharged with or without further treatment since it is then relatively clear water. The settled solids may then be disposed of or disintegrated or digested in further treatment generally referred to as sludge digestion.

The most generally used treatment to convert unsettleable solids to settleable solids depends upon the use of aerobic bacteria to biologically change the nature of these solids. Aerobic bacteria require the presence of free oxygen in contrast to anaerobic bacteria which live and are active in the absence of free oxygen. Aerobic bacteria may be supplied with this oxygen most readily by dissolving it in the water which constitutes the carrier liquid for sewage solids. The oxygen is inexpensively obtained by aerating the liquid with atmospheric air.

In the past various types of apparatus have been used. Ordinary pipes projecting into the liquid have been connected to an air compressor and air has been bubbled through the liquid in this fashion. Perforated pipes and other types of apparatus also have been used. The highest efficiency of dissolving oxygen in water occurs when the air bubbles are minute. This condition has been difficult to obtain when vast gallonages of sewage must be treated even for the small cities. A genuine need exists, accordingly, for improved aeration of sewage.

My invention achieves improved aeration of liquid by a combined process of agitation, pressure reduction, air injection and pressure restoration. Air injection is accompanied by a maximum of turbulence and injection apparatus is used which employs minute bubbles of air but with a large air volume flow.

It is a principal object of my invention to provide an improved method of aerating sewage.

It is an object of my invention to provide improved apparatus for the aeration of sewage.

Another object is to provide a method for aeration of sewage wherein reduced liquid pressure is combined with turbulence to achieve oxygen absorption or solution.

Another object is to provide a hollow impeller that delivers streams of fine bubbles into sewage.

Other objects and advantages of my invention will be apparent in the following description and claims considered together with the accompanying drawing forming an integral part of this application and in which:

FIGURE 1 is an elevation view in full section of apparatus embodying my invention.

FIGURE 2 is a section view along the line II—II of FIGURE 1 illustrating the construction of the impeller embodying the invention, and FIGURE 3 is a cross sectional view along the line III—III of FIG. 2 illustrating the construction of the hollow impeller blades.

Referring to the drawings, a conduit 10 has an upstream end 11, an enlarged pressure section 12 and a reducer section 13 forming the downstream end of the conduit, including an exit 14. While the conduit may be of any desired cross sectional shape, I employ for purposes of illustration a circular cross section. The upstream section 11 accordingly may have an inlet 16 having any selected diameter indicated by the letter D. A tube 17 may be secured to the conduit section 11 and must project through one sidewall thereof to support an impeller mount 18 preferably centrally disposed in the conduit 11. The tube 17 may have any desired cross section and at present I prefer to employ a teardrop cross section to reduce flow resistance. Mounted for rotation on the top of the impeller mount 18 is an impeller hub 19 to which is secured a plurality of impeller blades 21 tilted with respect to the plane of rotation as best shown in FIGURE 3. The impeller hub 19 is driven in rotation by a pump shaft 22 suitably keyed to the hub as at 23. The shaft 22 in turn may be driven by a motor M of any suitable type.

Connected to the outer end of the tube 17 is a pipe 24 connected to an air compressor C. This compressor C delivers atmospheric air through the tube 24 into the tube 17 and hence to the interior of the impeller mount 18. The impeller mount 18 has a central chamber 26 communicating with the tube 17 and opening at the top. The hub 19 has a central opening 27 in registry with the mount opening 26. Radial bores 28 connect this opening 27 to the interior of the hollow impeller blades 21. By means of this construction atmospheric air from the compressor C is forced into the interior of the impeller blades 21 and discharged through openings in the trailing edge of these impellers as is best illustrated in FIGS. 2 and 3.

The upper end of the impeller hub 19 is journaled against a stationary tube 31 welded or otherwise secured to a curved portion 32 of the intake section 11. The tube 31 is preferably of the same diameter as the largest portion of the impeller mount 18.

The curved portion 32 of the conduit 10 is reduced in cross section so that the total flow capacity is approximately that of the cross sectional flow capacity of the tube 11 adjacent to the impeller blades 21. Because of the fact that the tube 31 does intrude into the curved section 32 the diameter of this curved section is less than D, the diameter of the inlet 16.

Fluid flowing into the entire conduit 10 is designated by the arrow 33 and this flow emerging from the curved section 32 is introduced into the pressure section 12 of the conduit which is of larger diameter and preferably larger than D as indicated by the interior dimensions in the pressure section 12. Also the length of the pressure section 12 is important and at present I prefer to have the length at least five times D as indicated by the dimension. The reducer section 13 reduces the outlet 14 in size to that approximating the inlet 16, namely, the diameter of D.

Referring now particularly to FIGURES 2 and 3, the chamber 27 in the interior of the hub is shown in broken outline in FIGURE 2. As mentioned previously, this chamber receives compressed air which is discharged through the passages 28 to the interior of the hollow impeller blades 21. The construction of these blades is illustrated in detail in FIGURE 3 wherein an elongated U-shape is curved at the leading edge 32 and the branches of the U are shaped at the trailing edge 36. Spacer blocks 37 are welded, soldered or otherwise secured between the open ends of the U-shape to define a plurality of fine air outlets 38 through which the air bubbles. Because of the fact that the air outlets 38 in the trailing edge 36 of the impeller blades 21 are small, fine bubbles are formed which give large areas of contact with the fluid in the tube compared to large bubbles of the same cubic size as the multitude of small bubbles.

Referring now to the operation of my apparatus, the entire apparatus may be immersed in a pool 40 of sewage or the entire apparatus of FIG. 1 may be horizontally disposed and communicate with a pool of sewage below the top level line. The motor M is energized to rotate the impeller blades 21 causing sewage to flow through the conduit 10 in the direction of the arrow 33 and the compressor C is energized to direct air to the interior of the hollow impeller blades 21. Because of the bulk of the impeller mount 18 the cross section flow of the tube 11 is reduced at the region of the impeller compared to that of the inlet 16 thereby creating a region of low static pressure in accordance with Bernoulli's theorem. The tube 31 surrounding the pump shaft 22 maintains this reduced cross sectional area and down stream from the tube 31 the cross sectional area of the curved section 32 is reduced so that the cross-sectional capacity of the conduit section 11 is substantially the same from the impeller 21 to the pressure section 12.

The compressed air from the compressor C passes through the fine openings 38 in the trailing edge of the impeller blades 21 causing fine bubbles of air to intimately mix with the sewage flowing through the conduit section 11. Because of the reduced pressure at the region of the impeller blades 21, the oxygen in the air will more readily dissolve into the sewage than would be the case at the inlet 16. The impeller blades 21 serve the additional function of creating considerable turbulence as they rotate in the flow of sewage through the tube section 11, again increasing the amount of sewage in contact with each bubble. The impeller blades 21 accordingly serve the triple function of causing flow, causing turbulence and dispersing air in fine bubbles.

When the flow from the impeller blades 21 reaches the pressure section 12 of the conduit the static pressure is immediately increased because of the increased area of cross section 12. Turbulence is also increased at this section 12. In this increased pressure section 12 the duration of flow through this section is such as to promote the dissolving of oxygen into the sewage. The outlet 14, being of lesser diameter than the section 12, will ensure that none of the oxygen dissolved in the pressure chamber 12 will come out of the flow inasmuch as the static pressure at exit will be less than the static pressure at 12.

It will be appreciated by those skilled in the art that I have provided conditions most favorable toward the dissolving of oxygen in sewage. The air is broken into fine bubbles, the sewage is agitated at the region of injection of the air, and the static pressure is reduced. The use of the long pressure section 12 acts as a holding operation to insure satisfactory time of contact by the oxygen of the sewage. It will further be appreciated by those skilled in the art that the amount of oxygen dissolved in the sewage depends upon variable factors, including temperature of air and temperature of the sewage, as well as the speed of rotation of the impeller, the rate of flow of air and various other factors. The apparatus illustrated therefore is not quantitative in so far as supplying particular needs are concerned but is deemed to be merely illustrative so that ordinary engineering can relate the variable hydraulic and dissolving factors involved.

The apparatus described gives rise to a method of treatment of the sewage so that a maximum aeration is obtained. The disclosed method includes intimate contact between air and sewage by the use of small bubbles, agitation at the time of injection, and providing an area of reducing hydrostatic pressure at the region of injection.

There is also disclosed the use of the higher pressure holding step to insure satisfactory time of contact between air and sewage. While various devices can be used to obtain the steps of my method, the enclosed conduit 10 is a satisfactory means of quantitatively controlling all of these steps as contrasted to similar steps taking place in the center of a pool or in other environments.

While I have described my invention with respect to a specific illustration thereof, I do not limit myself to the specific aspects disclosed, nor do I limit myself in any other fashion and claim as my invention all modifications and variations that fall within the true spirit and scope of my invention.

I claim:
1. Apparatus for aerating sewage comprising:
 (a) a conduit;
 (b) an impeller disposed at a fixed point in said conduit to create a flow through the conduit;
 (c) means restricting the cross-section of the conduit at said impeller;
 (d) a source of air at greater than atmospheric pressure;
 (e) means connected to said source of air for injecting said air into the conduit at said impeller; and
 (f) a region of enlarged cross-section in said conduit that is at least twice the cross-section of the conduit at said impeller, at least five diameters in length, and located downstream from said impeller.
2. Apparatus as defined in claim 1 wherein the impeller has hollow blades having finely apertured trailing edges forming part of said means for injecting air into the conduit.

References Cited by the Examiner

UNITED STATES PATENTS

| | | | |
|---|---|---|---|
| 1,867,824 | 7/32 | Hammerly | 210—193 |
| 2,094,004 | 9/37 | Drake | 261—87 |
| 2,577,095 | 12/51 | Walker | 261—93 |
| 3,132,839 | 5/64 | Haekal | 261—87 X |

FOREIGN PATENTS 762,263   1/34   France.

MORRIS O. WOLK, *Primary Examiner.*